United States Patent
Gebel et al.

(10) Patent No.: US 6,962,053 B2
(45) Date of Patent: Nov. 8, 2005

(54) WIND POWER PLANT COMPRISING A SEAWATER DESALINATION SYSTEM

(75) Inventors: Joachim Gebel, Aachen (DE); Sonke Siegfriedsen, Friedrichstadt (DE); Yuce Suleyman, Aachen (DE)

(73) Assignee: Aerodyn Engineering GmbH, Rendsburg (DE)

(*) Notice: Subject to any disclaimer, the term of this patent is extended or adjusted under 35 U.S.C. 154(b) by 26 days.

(21) Appl. No.: 10/479,002

(22) PCT Filed: May 28, 2002

(86) PCT No.: PCT/DE02/01918

§ 371 (c)(1),
(2), (4) Date: Nov. 28, 2003

(87) PCT Pub. No.: WO02/097265

PCT Pub. Date: Dec. 5, 2002

(65) Prior Publication Data

US 2004/0156728 A1 Aug. 12, 2004

(30) Foreign Application Priority Data

May 30, 2001 (DE) .......................... 101 26 222

(51) Int. Cl.[7] .............................. F01K 27/00
(52) U.S. Cl. ........................... 60/641.1; 60/398
(58) Field of Search ................ 60/641.1, 398

(56) References Cited

U.S. PATENT DOCUMENTS

| 4,269,664 A | * | 5/1981 | Younger | 202/185.2 |
| 5,549,828 A | * | 8/1996 | Ehrlich | 210/602 |
| 5,565,096 A | * | 10/1996 | Phelan | 210/150 |
| 6,459,231 B1 | * | 10/2002 | Kagatani | 320/101 |

FOREIGN PATENT DOCUMENTS

| DE | 2928392 | * | 1/1981 |
| DE | 3808536 | * | 9/1989 |
| EP | 1182170 | * | 2/2002 |
| ES | 2134682 | * | 10/1999 |
| FR | 2531499 | * | 2/1984 |

* cited by examiner

Primary Examiner—Hoang Nguyen
(74) Attorney, Agent, or Firm—Larson & Larson, PA; Herbert W. Larson

(57) ABSTRACT

A wind power plant with a tower, a gondola carried by the latter so as to rotate about an axis and a rotor mounted in the gondola, the tower containing an evaporator and a vapor compressor mechanically driven by the rotor by a gear.

5 Claims, 1 Drawing Sheet

WIND POWER PLANT COMPRISING A SEAWATER DESALINATION SYSTEM

PRIOR APPLICATIONS

This application bases priority on International Application No. PCT/DE02/01918, filed May 28, 2002, which in turn bases priority on German Application No. DE 101 26 222.1, filed May 30, 2001.

BACKGROUND OF THE INVENTION

1. Field of the Invention

This invention relates to a wind power plant having a tower, a gondola carried by the latter, at least one rotor blade and a rotor hub mounted in the gondola.

2. Description of the Prior Art

Seawater desalination systems are known, which desalinate seawater, usually employing fossil energy sources. Even in the case of electrically operated systems working according to the reverse osmosis process, and the process involving evaporation and mechanical vapor compression, normally use electric power generated using fossil fuels.

DE 200 13 613 U1 discloses a wind power plant cooperating with a water purification system, and in whose tower is located a drinking water storage container. The water purification system supplying the storage container with drinking water is operated by means of electric power, which is generated in the conventional manner in a wind power plant.

DE 29 28 392 C2 describes a seawater desalination system with vapour compressor, in which the evaporator pipes are positioned horizontally. The vapor compressor is operated by means of an electric motor.

EP 1 182 170 A1 describes a wind power plant, whose tower contains a water evaporator system. Here again, the rotatory energy of the rotor is initially converted into electrical power, which is then used for operating the water purification system.

DE 36 13 871 C2 describes a method for operating a seawater desalination system by using wind power. Also in this case, the wind power is initially converted into electrical power, and this is then used for operating a steam compressor system.

The known wind power plants constructed for the treatment or purification of seawater suffer from the disadvantage that they convert the rotatory energy of the rotor into electrical power, and use the latter for water purification. This procedure is relatively expensive, involves high capital and operating costs, and suffers from poor efficiency due to the repeated energy conversion.

The problem of the invention is to provide a wind power plant, which is able to desalinate seawater in order to produce drinking water with high efficiency and using a simple structure.

According to the invention, this problem is solved by the features of claim 1, while the subclaims provide advantageous developments of the invention.

SUMMARY OF THE INVENTION

The essence of the invention is to directly use the essential part of the available kinematic energy of a wind power plant (i.e. without initially generating electric power) for operating the vapor compressor of a seawater desalination system.

The rotatory energy of the wind power plant rotor is transferred directly or indirectly by means of a miter gear to units of a vapor compressor system located in the tower of the wind power plant.

The invention makes it possible to use the translatory wind energy converted into rotatory energy with high efficiency for water desalination purposes, without it being initially converted into electric power.

DETAILED DESCRIPTION OF THE PREFERRED EMBODIMENT

Figure 1:
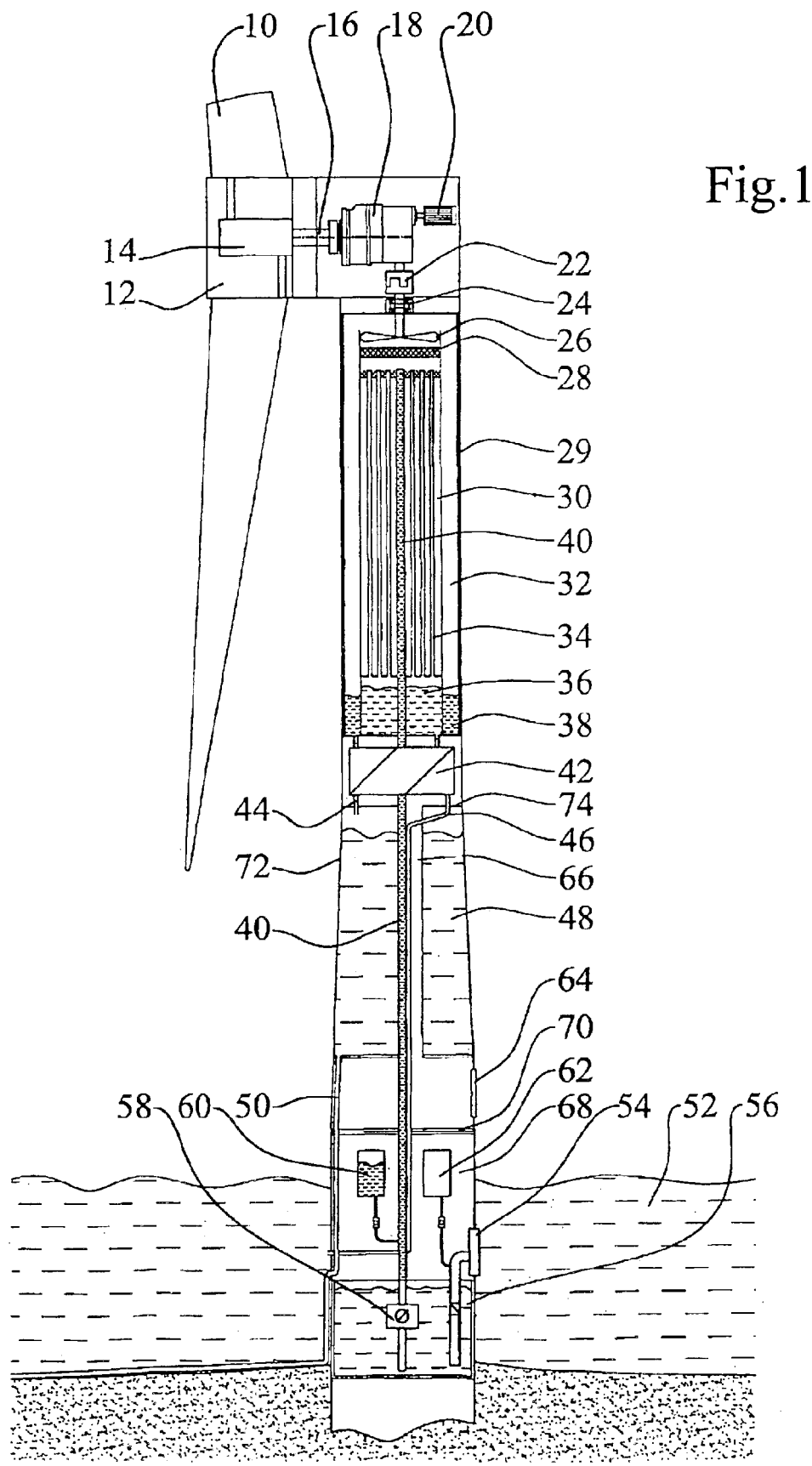
FIG. 1 shows a sectional view of the wind power plant having a seawater desalination system of the present invention.

The wind power plant comprises a rotor, generally with three rotor blades 10, a blade hub 12 and a blade adjusting device 14. The rotor 10, 12, 14 is mounted in a gondola installed in rotary manner on a tower 72. The gondola receives a miter gear 18, which transfers the mechanical rotatory energy supplied by means of the essentially horizontally positioned rotor shaft 16, and produced by the rotor by means of a coupling 22 to a vapor compressor 26 mounted in a bearing 24. The gondola also contains a generator 20 driven by means of the gear 18, and which supplies electric power by means of a not shown buffer battery to the not shown regulating devices and lift pump 58.

Below the vapor compressor 26 is positioned a falling film evaporator 30, which has a plurality of vertically standing heat exchanger tubes 34. Below the falling film evaporator 30 is positioned a collecting tank 36. The falling film evaporator 30 is surrounded by a heating jacket 32, which is outwardly thermally insulated to the tower wall and to the bottom of which is connected a distillate collecting tank 38.

Below the tanks 36, 38 is provided a heat exchanger 42 through which is guided on one side a seawater inflow 40 leading to the falling film evaporator 30, and on the other side the outflow from the tanks 36, 38.

Below the heat exchanger 42 is provided a maintenance platform 74, below which there is a distillate tank 48, which receives the distillate by means of a line 44 after passing through the heat exchanger 42, and which is connected by means of a distillate line 50 to a drinking water tank located outside the tower. Below the heat exchanger 42 is provided an entrance door 64 giving access to a bottom flange 70 of tower 72.

The seawater 52 to be desalinated passes by means of a filter 54 into a seawater reservoir 56 in the foundation part 68 of tower 72, from which it is raised by a lift pump 58 to the level of the falling film evaporator 30.

A tank 62 is used for chlorinating the water to be purified, and a tank 60 for supplying an antiscalant and a foam inhibiting oil for preventing foam formation.

During the operation of the system, seawater is supplied by means of filter 54 to the seawater reservoir 56. The lift pump 58 pumps the water upwards through the water inflow, the seawater is chlorinated for disinfection purposes, while an antiscalant for preventing salt deposits and for defoaming can be added to the water.

For preheating purposes, the seawater is passed through the heat exchanger 42, which is the subject to the action of the hot distillate, and concentrates flow from the evaporator 30. The seawater preheated close to the evaporation temperature is passed to the level of the head of the evaporator 30, and flows down again in the pipes of said evaporator 30.

As a result of the heat of the vapour or steam condensing on the other side of the pipes of evaporator 30, part of the water flowing down as a film is evaporated. This vapor is sucked up by the compressor 26 and, therefore, brought to a higher pressure and, consequently, temperature level. The thus produced steam can be used as heating steam, and is, in turn, passed to the evaporator where it condenses on the pipes and gives off the latent heat to the liquid film. The distillate obtained in condensate form is collected in the distillate collecting tank 38 and passed by means of the heat exchanger 42 into the distillate tank 48, and from there by means of line 50 to a drinking water storage container outside the system.

The concentrated seawater, i.e. the brine, is collected by the concentrate collecting tank 36, is passed through the heat exchanger 42 so that it gives off its heat to the after-flowing seawater and is then returned to the sea.

Having thus described the invention, what is claimed and desired to be secured by Letters Patent is:

1. A wind power plant in combination with a seawater desalination plant, the wind power plant comprising:
   a) a tower having a set of rotor blades mounted along a top portion of the tower on a rotor hub, the rotor blades rotating in response to wind acting upon the blades;
   b) a gondola mounted behind the rotor blades within the tower top portion, the gondola rotating about an axis in reaction to movement of the rotor blades;
   c) a rotor shaft connected to a miter gear mounted within the gondola cooperating with a water purification system located within the tower;
   d) the water purification system having a vapor compressor system with an evaporator located in the tower, a compressor mechanically driven by the miter gear of the wind power plant, a distillate tank positioned below the evaporator and a heat exchanger for preheating seawater that is passed to the evaporator.

2. The wind power plant in combination with the seawater desalination plant according to claim 1, wherein the evaporator located within the tower is positioned parallel to a vertical axis of the tower.

3. The wind power plant in combination with the seawater desalination plant according to claim 1, wherein the evaporator is a falling film evaporator.

4. The wind power plant in combination with the seawater desalination plant according to claim 1, further comprising a generator driven by the rotor hub.

5. The wind power plant in combination with the seawater desalination plant according to claim 1, wherein the heat exchanger is positioned intermediate the distillate tank and the evaporator.

* * * * *